Nov. 7, 1933.　　　　　C. B. SCHAFER　　　　　1,933,639
APPARATUS FOR USE IN THE MANUFACTURE OF LAMINATED GLASS
Filed April 8, 1931
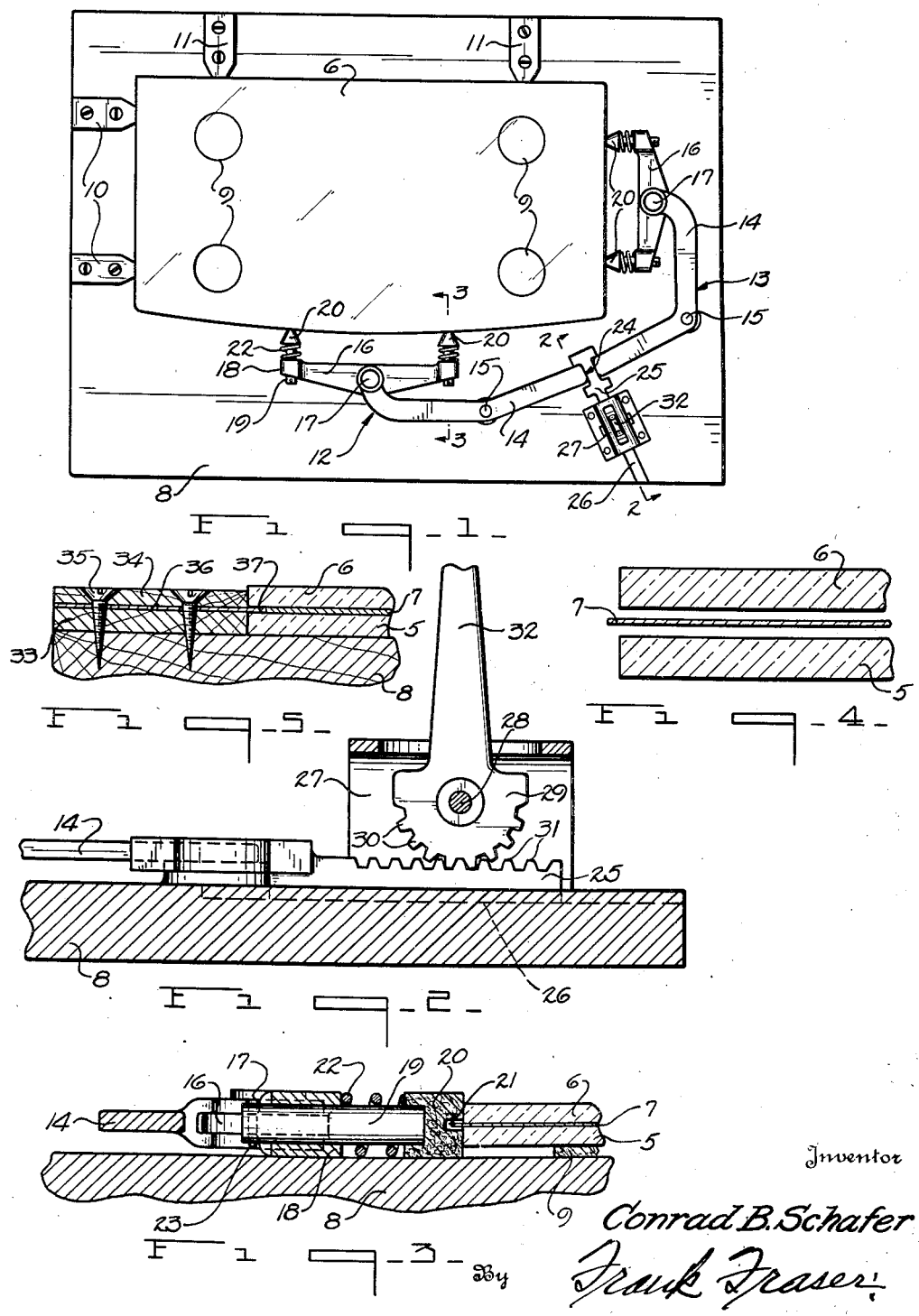
Inventor
Conrad B. Schafer
By Frank Fraser
Attorney Patented Nov. 7, 1933

1,933,639

UNITED STATES PATENT OFFICE 1,933,639

APPARATUS FOR USE IN THE MANUFACTURE OF LAMINATED GLASS

Conrad B. Schafer, Toledo, Ohio, assignor to Libbey-Owens-Ford Glass Company, Toledo, Ohio, a corporation of Ohio Application April 8, 1931. Serial No. 528,491

17 Claims. (Cl. 49—81)

The present invention relates to apparatus for use in the manufacture of laminated glass.

The expression "laminated glass" is used to designate a composite structure, consisting of two or more sheets of glass, and one or more non-brittle membranes interposed therebetween and bonded thereto. There are numerous processes that can be followed in the production of laminated glass and also various materials that can be used in its manufacture. Therefore, the present invention is in no way limited to any particular manner of producing the laminated glass, or the materials used.

In assembling the several sheets or laminations preparatory to the uniting thereof, great care must be exercised to see that they do not slip relative to one another since in the event they are not properly assembled, unnecessary grinding of the edges of the finished laminated sheet may be required.

An important object of this invention, therefore, resides in the provision of novel means for facilitating and improving the proper and accurate assembling of the several sheets or laminations relative to one another whereby to minimize the amount of grinding required after the laminations have been joined.

Other objects and advantages of the invention will become more apparent during the course of the following description when taken in connection with the accompanying drawing.

In the drawing forming a part of this application and wherein like numerals are employed to designate like parts throughout the same, Fig. 1 is a top plan view of an apparatus provided by the present invention, Fig. 2 is a section taken substantially on line 2—2 of Fig. 1, Fig. 3 is a section taken substantially on line 3—3 of Fig. 1, Fig. 4 is a fragmentary sectional view of the several laminations going to make up the laminated sheet but shown spaced from one another, and Fig. 5 is a detail sectional view of a slightly modified arrangement.

Referring first to Fig. 4 of the drawing, it will be seen that for the purposes of illustration the laminated sheet is adapted to consist of two sheets of glass 5 and 6 between which is interposed a non-brittle sheet or membrane 7. As has been set forth above, numerous processes can be followed in the production of the laminated sheet. By way of explanation, however, it may be pointed out that a pyroxylin plastic is commonly used as a non-brittle membrane, and this can be joined to the glass sheets by the use of any suitable skin coats, cements, bond inducing mediums, etc. It is customary to subject the laminations after they have been assembled in proper superimposed relation to the combined action of heat and pressure to produce a composite sheet.

The apparatus herein provided for use in the assembling of the several laminations preparatory to joining includes a horizontal table or other support 8 upon which the laminations are adapted to be laid one upon the other, said laminations being preferably supported on a plurality of pads 9 of a fibrous or other suitable material. Secured to the top of the table at the left hand end thereof are the spaced stops 10, while similar stops 11 are secured to the top of the table along the rear longitudinal edge thereof. When the several laminations are laid upon the table, the left hand end edges thereof are adapted to abut the stops 10 while the rear longitudinal edges engage the stops 11. Adapted to engage the right hand end edges of the laminations and also the forward longitudinal edges thereof are novel sheet holding and assembling means including two separate units 12 and 13 movable simultaneously by means of a common operating means towards and away from the respective sheet edges.

Each sheet holding unit 12 and 13 comprises a rocker arm 14 pivotally mounted intermediate its ends as at 15 to the table 8. Carried by each rocker arm at the forward end thereof is a supporting member 16 pivotally connected thereto intermediate its ends as at 17 and provided at each end with a horizontal bearing portion 18 through which is received a pin 19 carrying at its forward end a preferably wedge-shaped pad 20 also preferably of a fibrous material. This pad is adapted to engage the adjacent edges of the glass sheets 5 and 6 and, as shown in Fig. 3, is preferably provided with a slot 21 to receive therein any portion of the non-brittle membrane 7 which may project beyond the edges of the glass sheets. Encircling each pin 19 is a compression spring 22 acting to normally urge the respective pad 20 forwardly and to hold it in yieldable engagement with the sheet edges. The forward movement of the pin 19 is limited by a small pin 23 extending transversely therethrough rearwardly of bearing portion 18.

The inner adjacent ends of the rocker arms 14 are spaced from one another and are received within notches 24 provided in opposite sides of the horizontally slidable rack bar 25 which operates within a groove or channel 26 formed in the table 8. Arranged over the rack bar 25 is a housing 27, within the opposite side walls of which is journalled a horizontal shaft 28 having mounted thereupon a segment 29, the teeth 30 of which mesh with the teeth 31 in rack bar 25. The segment 29 is formed with a substantially vertical extension 32 constituting an operating handle or lever by means of which the segment may be swung in the desired direction so as to slide the rack bar either forwardly or rearwardly.

In the operation of the present invention, and when it is desired to assemble a plurality of laminations preparatory to joining, the operating lever 32 is first swung in a direction to slide the rack bar inwardly towards the center of the table 8, which movement will cause the rocker arms 14 to be swung about their pivot points 15 whereby to move the members 16 and pads 20 outwardly. The lower sheet of glass 5 is then laid upon the table so that its left hand edge and rear longitudinal edge abut the fixed stops 10 and 11 respectively, after which the non-brittle membrane 7 is laid upon the glass sheet so that it also abuts the stops 10 and 11. The upper sheet of glass 6 is then placed in a vertical position upon the non-brittle membrane adjacent the rear longitudinal edge thereof and then gradually lowered while being maintained in engagement with the fixed stops. The upper layer of glass is gradually laid downwardly and, just before touching the non-brittle membrane, the lever 32 is swung so as to move the rack bar 25 outwardly and thereby cause the rocker arms 14 to be swung in a direction to move the pads 20 into engagement with the sheet edges whereby to urge the upper sheet of glass, as well as the lower sheet, against the fixed stops. The forcing of the two sheets of glass against the said stops will cause them to line up with one another and be thereby properly assembled, with the result that the amount of edge grinding necessary subsequent to the uniting operation may be reduced to a minimum. The assembling of the several laminations in the manner above described may be rapidly and conveniently effected. It is desirable that the upper sheet of glass be properly positioned with respect to the lower sheet when initially laid thereupon since, after the glass sheet has once been brought into contact with the non-brittle membrane, it is difficult to slide it thereover so as to make it align with the lower glass sheet due to the tacky condition of the non-brittle membrane. Due to the pivotal mounting of the members 16, the pads 20 are self-aligning so as to adapt themselves to the curvature or angle of the sheet edges, while the springs 22, in addition to yieldably maintaining the pads in engagement with the sheets, will function as bumpers in order to prevent breaking of the glass which may be caused by excessive pressure on the lever 32.

In the event it is desired to use a non-brittle membrane which is slightly smaller than the glass sheets so as to facilitate the subsequent luting or sealing of the edges of the composite sheet, fixed stops of the type illustrated in Fig. 5 may be substituted for the stops 10 and 11, and the slots 21 in the pads 20 omitted. The fixed stop shown in Fig. 5 consists of the two superposed parts 33 and 34 secured to the table 8 by screws or the like 35 and between which parts is disposed a relatively thin plate 36. This plate projects forwardly beyond the parts 33 and 34 as indicated at 37 and is adapted to be received between the glass sheets 5 and 6 and to be engaged by the adjacent edge of the non-brittle membrane 7.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the assembling of a plurality of sheets of glass and an interposed non-brittle membrane prior to the uniting thereof to form safety glass, a support upon which the several laminations are adapted to be placed, fixed means carried by the support and against which certain edges of each of the laminations are adapted to abut, and movable means engaging other edges of the laminations for urging the said laminations into engagement with said fixed means.

2. In apparatus for use in the assembling of a plurality of sheets of glass and an interposed non-brittle membrane prior to the uniting thereof to form safety glass, a support upon which the several laminations are adapted to be placed, fixed means carried by the support and against which certain edges of each of the laminations are adapted to abut, movable means engaging other edges of the laminations for urging the said laminations into engagement with said fixed means, and means for yieldably maintaining said movable means in engagement with the laminations.

3. In apparatus for use in the assembling of a plurality of sheets of glass and an interposed non-brittle membrane prior to the uniting thereof to form safety glass, a support upon which the several laminations are adapted to be placed, fixed means carried by the support and against which certain edges of each of the laminations are adapted to abut, movable means engaging other edges of the laminations for urging the said laminations into engagement with said fixed means, and means for moving said movable means into and out of engagement with the laminations.

4. In apparatus for use in the assembling of a plurality of sheets of glass and an interposed non-brittle membrane prior to the uniting thereof to form safety glass, a support upon which the several laminations are adapted to be placed, fixed means carried by the support and against which certain edges of each of the laminations are adapted to abut, movable means engaging other edges of the laminations for urging the said laminations into engagement with said fixed means, means for yieldably maintaining said movable means in engagement with the laminations, and means for moving said movable means bodily into and out of engagement with said laminations.

5. In apparatus for use in the assembling of a plurality of sheets of glass and an interposed non-brittle membrane prior to the uniting thereof to form safety glass, a horizontal support upon which the several laminations are adapted to be laid in superimposed relation, fixed stops carried by the support and against which certain edges of each of the laminations are adapted to abut, and movable means engaging other edges of the laminations for urging the said laminations into engagement with the fixed stops.

6. In apparatus for use in the assembling of a plurality of sheets of glass and an interposed non-brittle membrane prior to the uniting thereof to form safety glass, a horizontal support upon which the several laminations are adapted to be laid in superimposed relation, fixed stops carried by the support and against which certain edges of each of the laminations are adapted to abut, movable means engaging other edges of the laminations for urging the said laminations into engagement with the fixed stops, and means for yieldably maintaining said movable means in engagement with the edges of the laminations.

7. In apparatus for use in the assembling of a plurality of sheets of glass and an interposed non-brittle membrane prior to the uniting thereof to form safety glass, a horizontal support upon which the several laminations are adapted to be laid in superimposed relation, fixed stops carried by the support and against which certain edges of each of the laminations are adapted to abut, movable means engaging other edges of the laminations for urging the said laminations into engagement with the fixed stops, and means for moving said movable means horizontally into and out of engagement with the laminations.

8. In apparatus for use in the assembling of a plurality of sheets of glass and an interposed non-brittle membrane prior to the uniting thereof to form safety glass, a horizontal support upon which the several laminations are adapted to be laid in superimposed relation, fixed stops carried by the support and against which certain edges of each of the laminations are adapted to abut, movable means engaging other edges of the laminations for urging the said laminations into engagement with the fixed stops, means for yieldably maintaining said movable means in engagement with the edges of the laminations, and means for moving the movable means horizontally into and out of engagement with said laminations.

9. In apparatus for use in the assembling of a plurality of sheets of glass and an interposed non-brittle membrane prior to the uniting thereof to form safety glass, a support upon which the several laminations are adapted to be placed, fixed means carried by the support and against which certain edges of each of the laminations are adapted to abut, and movable means engaging other edges of the laminations for urging the said laminations into engagement with said fixed means, said movable means including a plurality of edge engaging members, and means for yieldably maintaining said members in engagement with the laminations.

10. In apparatus for use in the assembling of a plurality of sheets of glass and an interposed non-brittle membrane prior to the uniting thereof to form safety glass, a support upon which the several laminations are adapted to be placed, fixed means carried by the support and against which certain edges of each of the laminations are adapted to abut, and movable means engaging other edges of the laminations for urging the said laminations into engagement with said fixed means, said movable means including a plurality of edge engaging members, means for yieldably maintaining said members in engagement with the laminations, and means for moving the members bodily with respect to said laminations.

11. In apparatus for use in the assembling of a plurality of laminations prior to the uniting thereof, a support upon which the several laminations are adapted to be placed, fixed means carried by the support and against which certain edges of the laminations are adapted to abut, and movable means engaging other edges of the laminations for urging the said laminations into engagement with said fixed means, said movable means including a plurality of edge engaging members, and means for pivotally mounting said members so that they will line up with the edges of the laminations.

12. In apparatus for use in the assembling of a plurality of laminations prior to the uniting thereof, a support upon which the several laminations are adapted to be placed, fixed means carried by the support and against which certain edges of the laminations are adapted to abut, and movable means engaging other edges of the laminations for urging the said laminations into engagement with said fixed means, said movable means including a plurality of pivotally mounted edge engaging members, and means for yieldably maintaining said members in engagement with the laminations.

13. In apparatus for use in the assembling of a plurality of laminations prior to the uniting thereof, a support upon which the several laminations are adapted to be placed, fixed means carried by the support and against which certain edges of the laminations are adapted to abut, and movable means engaging other edges of the laminations for urging the said laminations into engagement with said fixed means, said movable means including a plurality of pivotally mounted edge engaging members, means for yieldably maintaining said members in engagement with the laminations, and means for moving the members bodily with respect to said laminations.

14. In apparatus for use in the assembling of a plurality of laminations prior to the uniting thereof, a support upon which the several laminations are adapted to be placed, fixed means carried by the support and against which certain edges of the laminations are adapted to abut, and movable means engaging other edges of the laminations for urging the said laminations into engagement with said fixed means, said movable means including a pair of rocker arms pivotally mounted intermediate their ends, a plurality of edge engaging members carried at the forward end of each rocker arm, and a common operating means engaging the adjacent inner ends of said rocker arms for swinging the same about their pivots to move the edge engaging members into or out of engagement with the laminations.

15. In apparatus for use in the assembling of a plurality of laminations prior to the uniting thereof, a support upon which the several laminations are adapted to be placed, fixed means carried by the support and against which certain edges of the laminations are adapted to abut, and movable means engaging other edges of the laminations for urging the said laminations into engagement with said fixed means, said movable means including a pair of rocker arms pivotally mounted intermediate their ends, a plurality of edge engaging members carried at the forward end of each rocker arm, spring means for yieldably maintaining said members in engagement with the edges of the laminations, and a common operating means engaging the adjacent inner ends of said rocker arms for swinging the same about their pivots to move the edge engaging members toward and away from the laminations.

16. In apparatus for use in the assembling of a plurality of laminations prior to the uniting thereof, a support upon which the several laminations are adapted to be placed, fixed means carried by the support and against which certain edges of the laminations are adapted to abut, and movable means engaging other edges of the laminations for urging the said laminations into engagement with said fixed means, said movable means including a pair of rocker arms pivotally mounted intermediate their ends, a member pivotally connected to the forward end of each rocker arm, a plurality of pads carried by each member and adapted to engage the adjacent edges of the laminations, and a common operating means engaging the adjacent inner ends of the rocker arms for swinging the same simultaneously about their pivots to move the pads into and out of engagement with the edges of said laminations.

17. In apparatus for use in the assembling of a plurality of laminations prior to the uniting thereof, a support upon which the several laminations are adapted to be placed, fixed means carried by the support and against which certain edges of the laminations are adapted to abut, and movable means engaging other edges of the laminations for urging the said laminations into engagement with said fixed means, said movable means including a pair of rocker arms pivotally mounted intermediate their ends, a member pivotally connected to the forward end of each rocker arm, a plurality of pads carried by each member and adapted to engage the adjacent edges of the laminations, spring means for yieldably maintaining said pads in engagement with said edges, and a common operating means engaging the adjacent inner ends of the rocker arms for swinging said rocker arms simultaneously about their pivots to move the pads into and out of engagement with the edges of the laminations.

CONRAD B. SCHAFER.